US011260732B1

(12) United States Patent
Wedekind et al.

(10) Patent No.: US 11,260,732 B1
(45) Date of Patent: Mar. 1, 2022

(54) SUNROOF SEAL APPARATUS AND RELATED SUNROOF ASSEMBLIES FOR USE WITH VEHICLES

(71) Applicant: AISIN TECHNICAL CENTER OF AMERICA, INC., Northville, MI (US)

(72) Inventors: Micah Wedekind, Northville, MI (US); Jacob Grimaldo, Northville, MI (US); Chanli Ke, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 17/103,598

(22) Filed: Nov. 24, 2020

(51) Int. Cl.
*B60J 7/043* (2006.01)
*B60J 10/72* (2016.01)
*B60J 10/82* (2016.01)

(52) U.S. Cl.
CPC .............. *B60J 7/043* (2013.01); *B60J 10/72* (2016.02); *B60J 10/82* (2016.02)

(58) Field of Classification Search
CPC ... B60J 7/043; B60J 10/00; B60J 10/72; B60J 10/82
USPC ........................................... 296/216.01–0.09
See application file for complete search history.

(56) References Cited

U.S. PATENT DOCUMENTS 9,233,600 B2 * 1/2016 Nellen .................... B60J 7/0046

FOREIGN PATENT DOCUMENTS

DE    3718817 A1 * 12/1988 ............... B60J 7/053
JP    2593377 B2 *  3/1997 ................. B60J 7/12

OTHER PUBLICATIONS

Reinsch Burkhard et al., "Sliding roof for vehicles", Dec. 15, 1988, European Patent Office, Edition: DE3718817A1 (Year: 1988).*
Ito Katsunori, "To provide a roof structure of an awning type sunroof", May 5, 1999, Japan Paten Office, Edition: JP2593377Y (Year: 1999).*

* cited by examiner

*Primary Examiner* — Dennis H Pedder
*Assistant Examiner* — Joyce Eileen Hill
(74) *Attorney, Agent, or Firm* — Oblon, McClelland, Maier & Neustadt, L.L.P.

(57) ABSTRACT

A disclosed assembly includes a rail and an inner seal fixedly coupled to the rail that is arranged along a length of the rail. The inner seal includes a flap hiding a part of the rail adjacent the flap from view in a vehicle cabin. A shoe slidably coupled to the rail adjacent the flap is movable along the rail to open or close a sunshade held by the shoe. A channel extending through the shoe receives the flap. The shoe is engaged with a first segment of the flap folded in the channel while a second segment of the flap external to the channel is unfolded. Movement of the shoe causing the second segment to pass into the channel and fold therein as the first segment exits the channel and unfolds to prevent the part of the rail from being exposed.

9 Claims, 11 Drawing Sheets

SUNROOF SEAL APPARATUS AND RELATED SUNROOF ASSEMBLIES FOR USE WITH VEHICLES

FIELD OF THE DISCLOSURE

This disclosure relates generally to vehicles and, more particularly, to sunroof seal apparatus and related sunroof assemblies for use with vehicles.

BACKGROUND

Motor vehicles typically employ sunroofs to improve comfort of vehicle occupants by allowing sunlight to enter a vehicle cabin through a sunroof panel (e.g., glass). Some vehicle sunroofs are configured to open and close, which may be desirable to the vehicle occupants (e.g., when the vehicle cabin is relatively hot). For example, a known vehicle sunroof may have a panel that can be moved (e.g., tilted, raised, lowered, etc.) in response to a sunroof motor generating output.

SUMMARY

An aspect of the present disclosure includes an assembly for a sunroof of a vehicle. The assembly includes a rail extending in a length direction of the vehicle. The rail includes a guide channel to receive and guide at least one movable sunroof component. The assembly also includes an inner seal fixedly coupled to the rail that is arranged along a length of the rail between a panel of the sunroof and an interior roof portion of the vehicle. The inner seal includes a flap extending in a downward direction away from an attachment point of the inner seal and the rail to hide a part of the rail adjacent the flap from view in a vehicle cabin. The assembly also includes a shoe slidably coupled to the rail adjacent the flap that is movable along the rail to open or close a sunshade held by the shoe. The shoe includes a channel extending through the shoe that receives the flap. The shoe is engaged with a first segment of the flap folded in the channel while a second segment of the flap external to the channel is unfolded. Movement of the shoe along the rail toward the second segment causes the second segment to pass into the channel and fold therein as the first segment exits the channel and unfolds to prevent the part of the rail from being exposed.

The foregoing paragraph has been provided by way of general introduction, and is not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Some vehicle sunroofs have known inner seals that serve to hide sunroof components and provide a small amount of wind noise reduction for a passenger compartment. For example, a known inner seal can be arranged along a track or rail of a sunroof to cover a glass attachment of the sunroof. However, such a known inner seal may leave at least part of the rail exposed such as a channel in the rail beneath the seal containing grease, which may be undesirable to an occupant or person in the vehicle. To reduce visibility of the rail inside the passenger compartment, the rail may be anodized black, which increases costs.

Sunroof seal apparatus and related sunroof assemblies for use with vehicles are disclosed. Examples disclosed herein provide a compact, lightweight, and cost-effective solution to advantageously hide one or more components (e.g., at least one of a track or rail, a glass attachment, and the like) of a sunroof from an occupant's view and keep the component(s) hidden during sunshade operation. The sunroof in which examples disclosed herein can be implemented is provided with a sunshade (e.g., a fabric sheet) that can extend and/or move to a closed position, which covers a glass panel of the sunroof to provide shade to an occupant in a cabin of the vehicle. The sunshade can also retract and/or move to an open position, which uncovers the glass panel to allow additional light to enter the cabin. Further, the sunroof can include at least one rail defining a guide channel extending through the rail to receive and guide movable sunroof component(s).

Some disclosed examples provide an exemplary assembly for the sunroof including a seal (e.g., an inner seal) and a sunshade shoe (e.g., a motor-driven shoe) that holds the sunshade and particularly interacts with the seal. The disclosed seal can be arranged around a roof opening and fixedly coupled to an inner part of the rail. In some examples, the seal is interposed between an interior roof portion (e.g., a headliner) of the vehicle and encapsulation material around a glass holder bracket that supports the glass panel, such that an upper portion of the seal engages the encapsulation material to facilitate reducing wind noise. The upper portion of the seal covers one or more glass attachments of the sunroof adjacent the seal and/or hides the glass attachment(s) from view inside the cabin. In particular, the seal includes a lower flap extending away from an attachment point of the seal and the rail that similarly covers a particular part of the rail (e.g., a guide channel that may contain grease) adjacent the seal and/or hides the rail from view inside the cabin. When the disclosed seal is installed, no part of the rail is exposed to vehicle occupant(s) in the cabin. The flap may extend toward the headliner, such that an end of the flap is in-line with the headliner to provide an even appearance. Additionally, the end of the flap may be spaced from the rail by a relatively small distance.

The disclosed sunshade shoe is slidably coupled to the rail adjacent the lower flap of the seal. The sunshade shoe is configured to hold the sunshade, for example, via a roll shade bar around which the sunshade is wrapped that is
} connected to the sunshade shoe. The roll shade bar may extend across the sunroof in a width direction of the vehicle away from the sunshade shoe to couple the sunshade shoe to another shoe on an opposite side of the sunroof. To adjust the sunshade between the different positions, the sunshade shoe can slide along the rail (e.g., in tandem with the other shoe) relative to the seal. In some examples, the sunshade shoe receives the lower flap in a channel (e.g., a folding channel) extending through the shoe, which facilitates flipping, folding, and/or otherwise manipulating the flap to allow movement of the sunshade shoe without revealing the rail. For example, surfaces of the sunshade shoe that define the channel are configured to engage a first segment of the flap in the channel, thereby forming a fold on the first segment that extends along the first segment across the channel. The sunshade shoe may be positioned beneath such a fold between the flap and the headliner of the vehicle.

As will be discussed further below, the sunshade shoe can slide against the flap of the seal during sunshade operation, thereby flipping an adjacent segment of the flap up and out of the way. For example, when the sunshade shoe moves in a certain direction toward a second segment (e.g., an unfolded segment) of the flap external to the channel, the second segment of the flap passes into the channel and engages the shoe as the first segment exits the channel and disengages the shoe. In particular, such movement of the sunshade shoe causes the second segment to fold in the channel as the first segment unfolds behind the shoe or returns to an initial position to prevent the rail from being exposed. The sunshade shoe and the seal may remain engaged in such a manner at all times during sunshade operation to create a smooth, seamless transition while never revealing the rail. As a result, the rail of the sunroof does not need to be anodized black, which saves costs.

Thus, the disclosed seal and sunshade shoe, together, hide the sunroof rail from view at all times inside the cabin of the vehicle, while also hiding glass attachment(s) and providing at least some amount of noise reduction. The disclosed design creates a more appealing appearance in the vehicle by having the lower flap hang down slightly away from the rail and more in-line with the headliner. Examples disclosed herein can be advantageously utilized in a wide-range of sunshade systems including a previously established system, regardless of fabric style and without affecting the cross section of the rail.

Figure 1:
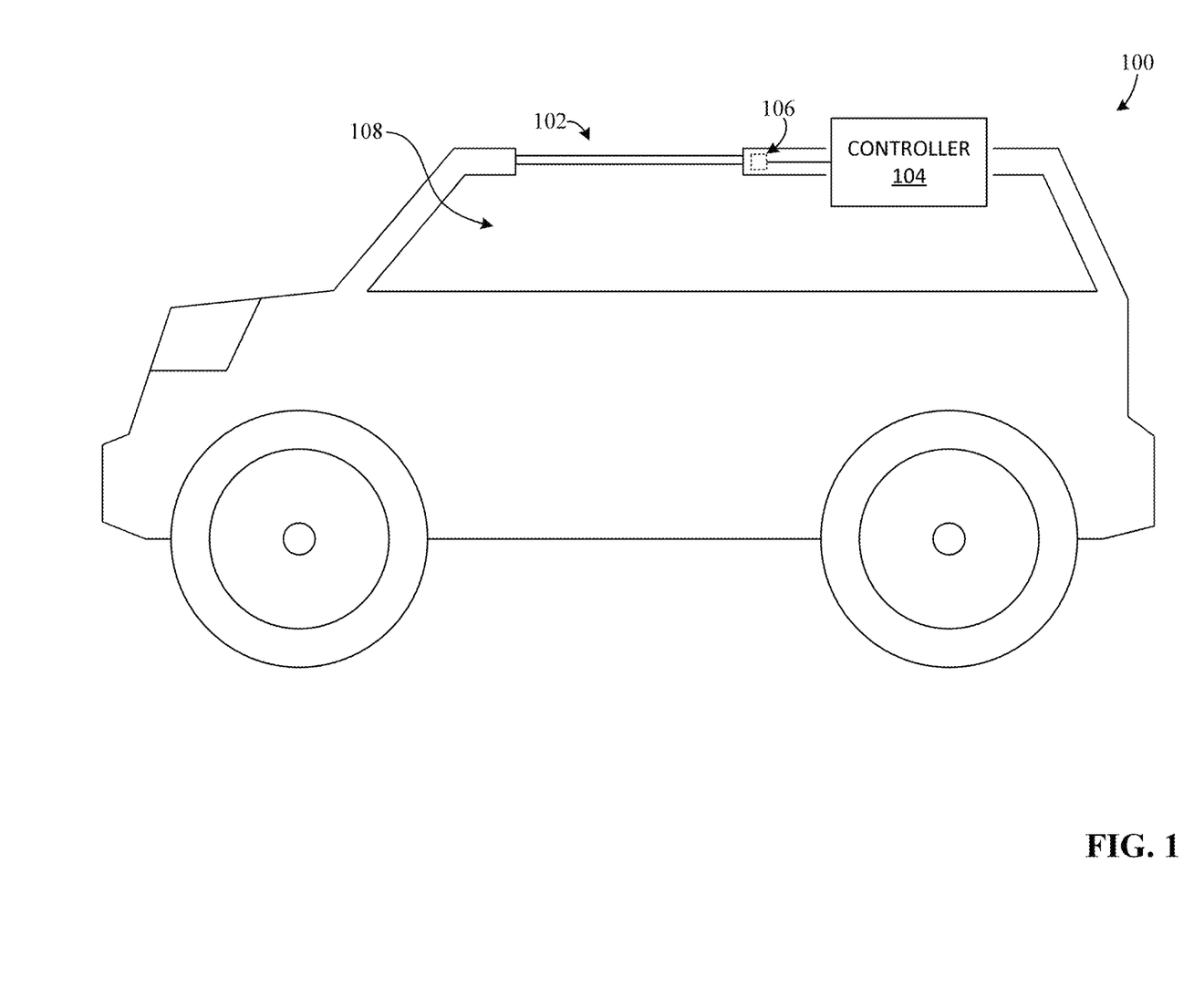
FIG. 1 is a view of an example vehicle in which examples disclosed herein can be implemented.

FIG. 1 is a view of an example vehicle (e.g., a motor vehicle) 100 in which examples disclosed herein can be implemented. The vehicle 100 of FIG. 1 could be, for example, any of a car, a van, a truck, a sport utility vehicle (SUV), and like, or any other suitable motor vehicle. According to the illustrated example of FIG. 1, the vehicle 100 includes an example sunroof 102, an example controller 104, and one or more example motors 106. The controller 104 of FIG. 1 is structured and/or configured to control the motor(s) 106 to change a state of the sunroof 102, for example, from a first state (e.g., a closed state) to a second state (e.g., an open state) or vice versa. In some examples, the controller 104 of FIG. 1 receives a user input from an input device (e.g., an in-vehicle button or switch accessible to an occupant in the vehicle 100) connected to the controller 104 and, in response, opens or closes the sunroof 102 via the motor(s) 106 and based on the user input. Additionally or alternatively, the controller 104 can similarly control the motor(s) 106 to adjust a sunshade of the sunroof 102.

The controller 104 of FIG. 1 can be implemented, for example, using one or more microcontrollers, one or more electronic control units (ECUs), and the like, any other suitable control circuitry, or a combination thereof. As such, the controller 104 may include at least one processor and a database in communication with the processor. The controller 104 is sometimes referred to as a sunroof controller and/or a vehicle controller. Additionally, the controller 104 is communicatively coupled to the motor(s) 106, for example, via a transmission or signal wire, a bus, radio frequency, etc. In some examples, the controller 104 provides electrical power and/or one or more control signals or commands to the motor(s) 106, thereby controlling the motor(s) 106 and/or an output thereof (e.g., a torque and/or a force). In other examples, the controller 104 receives (e.g., continuously and/or repeatedly) data from the motor(s) 106, such as positional data that may be indicative of a panel position, a sunshade position, and/or the state of the sunroof 102.

The controller 104 of FIG. 1 may also be communicatively coupled to an input device, which facilitates interactions between the controller 104 and a person or user. The input device may be positioned in the vehicle 100 such that a vehicle occupant can activate and/or provided an input to the input device. In some examples, the controller 104 receives input data from the input device corresponding to a certain panel position, sunshade position, and/or sunroof state. In response to receiving the input data, the controller 104 processes the input data and/or directs the motor(s) 106 in accordance with the input data.

The sunroof 102 of FIG. 1 can be implemented, for example, using any of a panoramic sunroof, a pop-up sunroof, a sliding sunroof, a spoiler sunroof, and the like, or any other suitable vehicle sunroof. The sunroof 102 is sometimes referred to as a vehicle sunroof. In some examples, the sunroof 102 is structured and/or configured to open, close, vent, and/or change between different sunroof states, for examples, in response to the motor(s) 106 generating output. As such, the sunroof 102 may be provided with at least one movable panel (e.g., a glass panel) that can be tilted, raised, lowered, and the like. In such examples, when closed or in the first state, the sunroof 102 of FIG. 1 substantially isolates a cabin 108 of the vehicle 100 from an outside or external environment, such that external fluids (e.g., water, air, etc.) are prevented from flowing into the cabin 108 through the sunroof 102. Of course, light (e.g., sunlight) may be transmitted through the panel(s) of the sunroof 102 when the sunroof 102 is closed or in the first state. On the other hand, when open or in the second state, the sunroof 102 exposes the vehicle cabin 108 to the external environment, such that ambient air is permitted or enabled to flow into the vehicle cabin 108, which may be desired by a driver and/or vehicle occupant(s) in certain driving conditions. Further, in some examples, the sunroof 102 is provided with a sunshade that can be extended and/or moved (e.g., via the motor(s) 106) from an open position to a closed position to cover the panel, which provides shade in the cabin 108 of the vehicle 100.

The motor(s) 106 of FIG. 1 can be implemented, for example, using one or more electric motors. The motor(s) 106 are coupled to the sunroof 102 and/or supported by a sunroof component. Further, the motor(s) 106 may be communicatively coupled to the controller 104. In some examples, in response to receiving the power and/or the control signal(s) or command(s) from the controller 104, the motor(s) 106 cause the sunroof 102 to open, close, and/or change between the different sunroof states.

Figure 2:
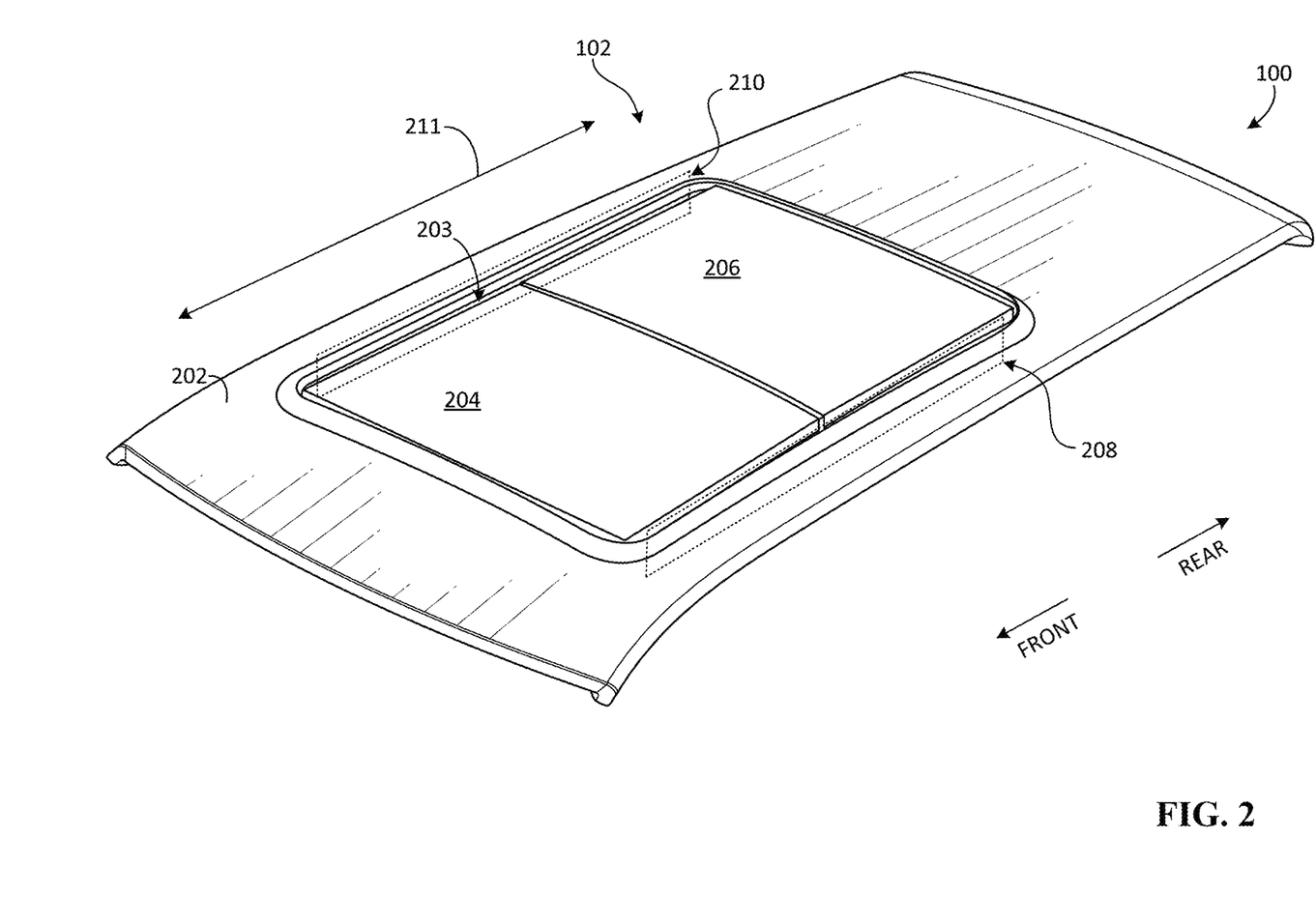
FIG. 2 is a partial-view of the example vehicle of FIG. 1 and shows a sunroof in a closed state.

FIG. 2 is a partial-view of the vehicle 100 and shows the sunroof 102 in the first state. The sunroof 102 of FIG. 2 is coupled to a roof 202 of the vehicle 100, for example, via one or more example fasteners and/or one or more example fastening methods or techniques. Further, the sunroof 102 of FIG. 2 or at least part thereof is disposed in an opening 203 extending through the roof 202 that is sized and/or shaped to receive one or more sunroof components. The sunroof 102 may be provided with one or more example panels (e.g., glass panels) 204, 206, two of which are shown in this example (i.e., a first panel 204 and a second panel 206). In some examples, the first panel 204 is movable and/or is configured to move between a first panel position (as shown in FIG. 2) and a second panel position different from the first panel position, which changes the state of the sunroof 102. The first panel position can be, for example, a lowered position of the first panel 204 corresponding to the first state of the sunroof 102. On the other hand, the second panel position can be, for example, a tilted position or a raised position of the first panel 204 corresponding to the second state of the sunroof 102. In such examples, the first panel 204 can slide over or under the second panel 206 to open the sunroof 102. Additionally or alternatively, in some examples, the second panel 206 of FIG. 2 is likewise movable and/or configured to move between the first panel position and the second panel position.

As previously mentioned, the sunroof 102 of FIG. 2 is in the first state. As such, the first panel 204 of FIG. 2 is in the first panel position, and/or the second panel 206 of FIG. 2 is in the first panel position. To facilitate controlling panel positions, the sunroof 102 may be provided with one or more single link assemblies associated with translating a first side of the first panel 204 and a second side of the first panel 204 opposite to the first side. In some examples, each single link assembly may include one or more particular sunroof components that function cooperatively to adjust a position and/or an orientation of the first panel 204 based on motor output. Such component(s) include, but are not limited to, any of an adjustable bracket, a slidable shoe connected to a motor 106 (e.g., via a cable, a belt, a chain, etc.), a rotatable link, a guide block, a guide track or rail, a cable, and the like, any other suitable component(s) associated with sunroof operation, or a combination thereof. In such examples, when the motor(s) 106 generate output, the one or more single link assemblies advantageously guide the first panel 204 of FIG. 2 between the first and second panel positions. Additionally, when the motor(s) 106 cease generating the output, the one or more single link assemblies can effectively hold the first panel 204 in one of the first panel position, the second panel position, or a different panel position, where the first panel 204 is substantially immobile (e.g., until subsequent motor output is generated In some examples, a first sunroof rail 208 coupled to the roof 202 may extend in a length direction of the vehicle 100 across a certain dimension (e.g., a length) 211 of the sunroof 102 or at least part of the dimension 211, which provides one or more paths or guideways along which movable sunroof components can travel. The first rail 208 is positioned substantially at a first side of the sunroof 102. Similarly, a second sunroof track or rail 210 extending in the length direction of the vehicle 100 can be coupled to the roof 202, which is positioned substantially at a second side of the sunroof 102 opposite to the first side. Each of the first and second rails 208, 210 is represented by the dotted/dashed lines of FIG. 2 and sometimes referred to as a track. In such examples, the first rail 208 and second rail 210 can be configured to guide movement of one or more slidable shoes holding a sunshade during a sunshade adjustment operation of the sunroof 102, as discussed further below.

Figure 3A:
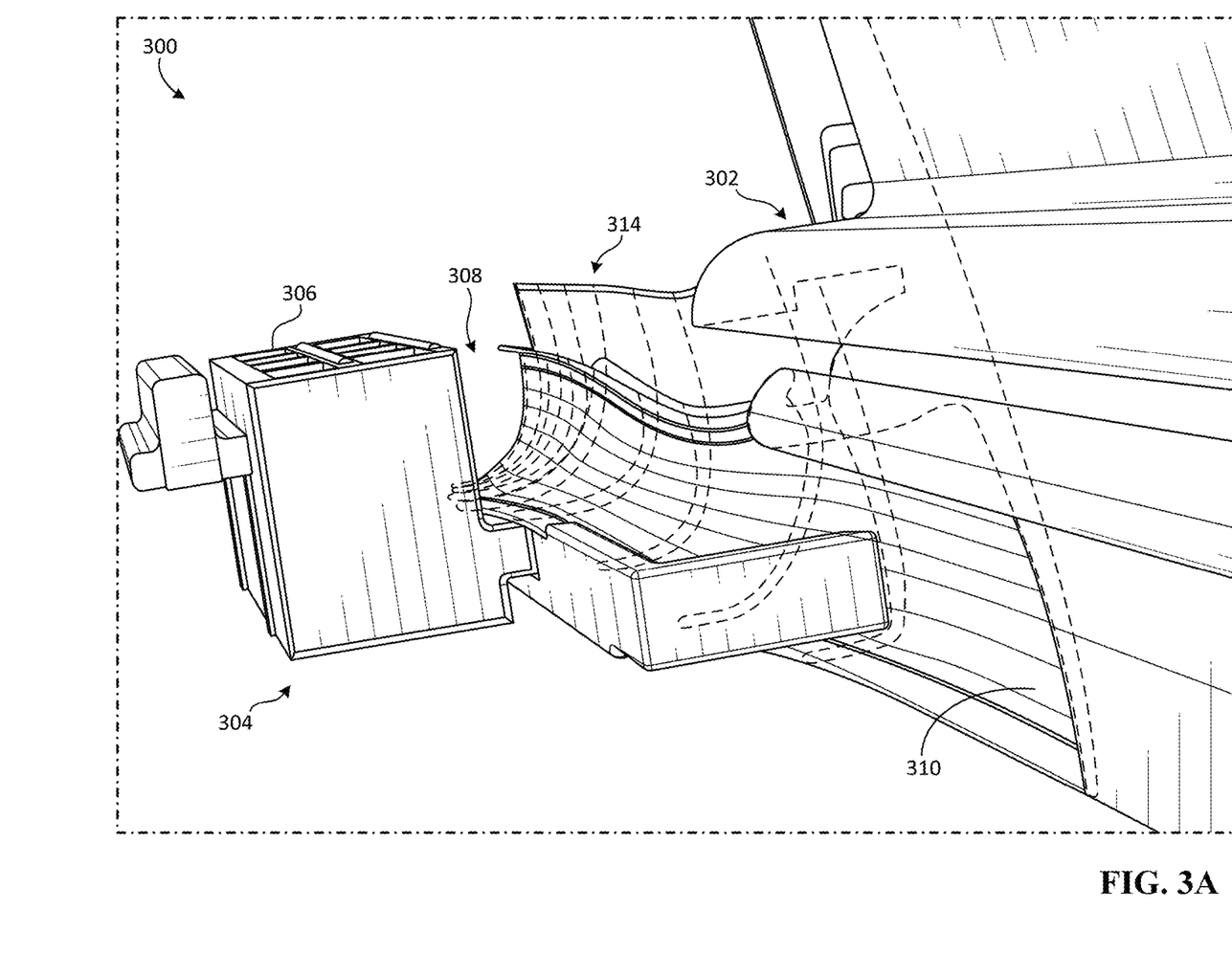
FIGS. 3A, 3B, and 3C are detailed views of an exemplary assembly for the sunroof including an exemplary seal and an exemplary sunshade shoe in accordance with the teachings of this disclosure.
Figure 3B:
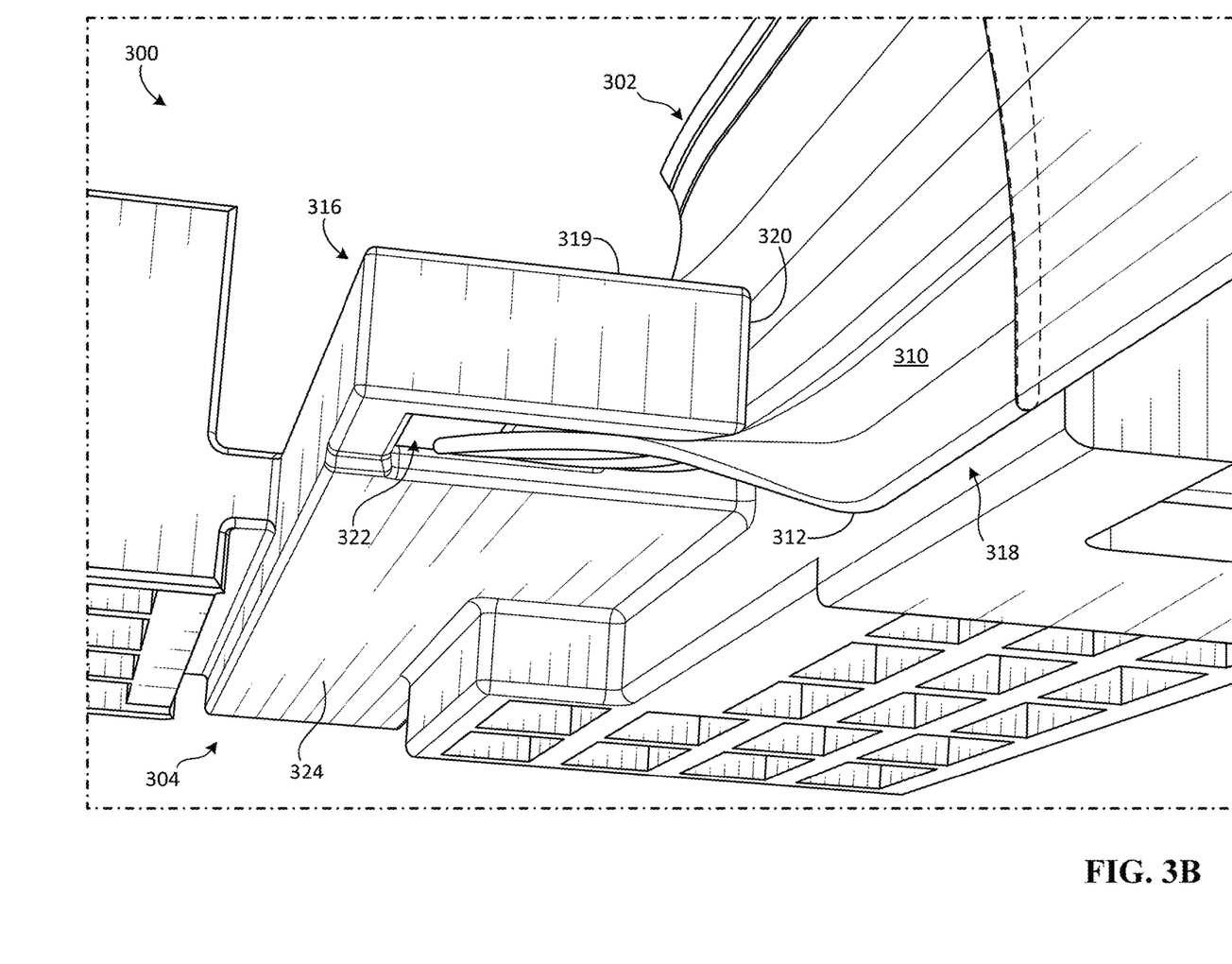
Figure 3C:
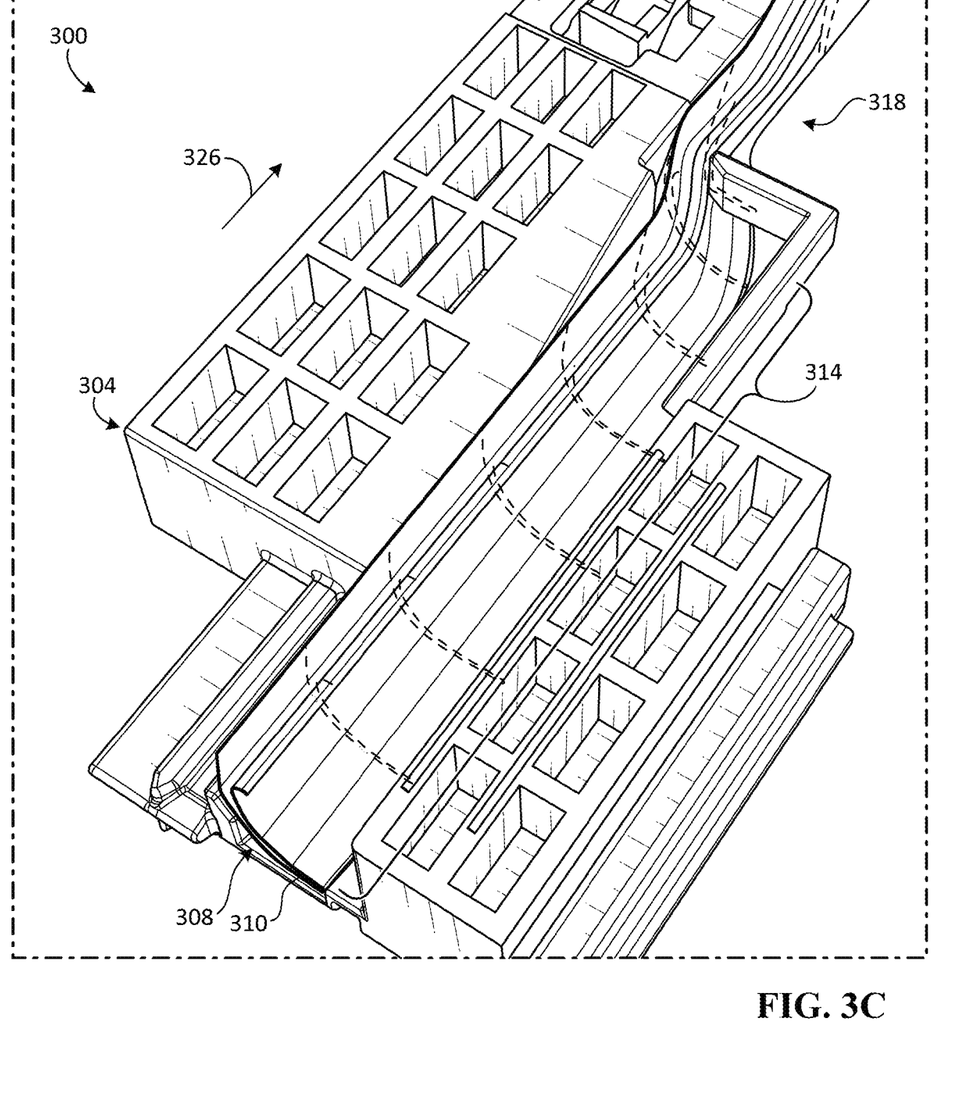

FIGS. 3A, 3B, and 3C are detailed views of an exemplary assembly 300 for the sunroof 102 including an exemplary seal (e.g., an inner seal) 302 and an exemplary sunshade shoe 304 in accordance with the teachings of this disclosure. The assembly 300, when assembled, forms and/or defines at least a part of the sunroof 102. Turning to FIG. 3A, a perspective view of the assembly 300 is shown in the illustrated example. The seal 302 of FIG. 3A can be fixedly coupled to a track or rail of the sunroof 102 and arranged along a length of the rail, such as the first or second rail 208, 210 previously described. The seal 302, when installed in the sunroof 102, may extend around the entire opening 203 in the roof 202 or at least part thereof, which facilitates reducing wind noise as well as hiding one or more sunroof components from view in the vehicle cabin 108. The sunshade shoe 304 of FIG. 3A can be slidably coupled to the rail, where the sunshade shoe 304 can move along the rail relative to the seal 302 to adjust a sunshade (e.g., a fabric sheet) held by the shoe 304. In some examples, a guide member (e.g., a block) 306 on the sunshade shoe 304 is positionable in a certain guide channel of the rail, where the guide member 306 can slide through the guide channel.

In FIG. 3A, the sunshade shoe 304 includes an example channel (e.g., a folding channel) 308 that receives a portion of the seal 302, which facilitates flipping, folding, and/or manipulating the seal 302 to allow relative movement of the sunshade shoe 304 while preventing exposure the rail behind the seal 302. In some examples, the seal 302 includes a flap (e.g., a lower flap) 310 engaged with the sunshade shoe 304 that extends through the channel 308. When the seal 302 is installed, the flap 310 covers and/or hides a part of the rail (e.g., see the guide channel 614 of FIG. 6A) adjacent the flap 310 so that an occupant in the vehicle 100 cannot see and/or interact with the part of the rail. Additionally, the flap 310 or at least a portion thereof is flexible, such that the flap 310 can elastically deform around the sunshade shoe 304. In particular, one or more surfaces of the sunshade shoe 304 creating the channel 308 are configured to engage a flexible portion of the flap 310, thereby forming a fold 312 (shown in FIG. 3B) on a first segment 314 of the flap 310 in the channel 308. The fold 312 may extend along the first segment 314 of the flap 310 across the channel 308. As will be discussed further below, the sunshade shoe 304 can slide against the flexible portion of the flap 310 during sunshade operation to change a location of the fold 312 in the flap 310, where the sunshade shoe 304 and the flap 310 remain substantially engaged as a position of the sunshade shoe 304 is adjusted.

Turning to the FIG. 3B, an additional perspective view of the assembly 300 is shown in which a flipping structure 316 on the sunshade shoe 304 adjacent the channel 308 is directly contacting the flap 310 of the seal 302. The sunshade shoe 304 can be provided with the flipping structure 316, which is attached to the sunshade shoe 304 to facilitate forming a fold 312 on the flap 310 by particularly positioning and/or orienting a second segment (e.g., an unfolded segment) 318 of the flap 310 different from the first segment 314. The second segment 318 of the flap 310 is adjacent and/or connected to the first segment 314. Unlike the first segment 314 of the flap 310, the second segment 318 of FIG. 3B is external to the channel 308 and unfolded. In some examples, the flipping structure 316 is a hook 319 including an end 320 abutting the flap 310. In such examples, the end 320 of the hook 319 is configured to impart a certain force on the second segment 318 of the flap 310 that urges the second segment 318 or a portion thereof to move away from the rail into a substantially vertical orientation. In FIG. 3B, a portion of the flap 310 is positioned in an aperture 322 that is formed and/or defined by the flipping structure 316 and a body 324 of the sunshade shoe 304. When closing the sunshade held by the shoe 304, the flap 310 may be fed into the channel 308 through the aperture 322 to facilitate transitioning between an unfolded state and a folded state.

Turning to FIG. 3C, an additional perspective view of the assembly 300 is shown in which the first segment 314 of the flap 310 is engaged with the sunshade shoe 304 and folded in the channel 308, while the second segment 318 is external to the channel 308 and unfolded. The fold 312 formed on the first segment 314 by the sunshade shoe 304 may extend across the channel 308 from an end of the channel 308 to an opposite end of the channel 308. In particular, the sunshade shoe 304 of FIG. 3C can move (e.g., via motor output applied to the shoe 304) along the rail in a first direction (e.g., a forward direction) 326 relative to the seal 302 from a first position in which the sunshade is open to a second position in which the sunshade is closed, where the sunshade shoe 304 slides against the flap 310 while the sunshade closes. As the sunshade shoe 304 moves in the first direction 326 away from the first segment 314 and/or toward the second segment 318, the first segment 314 of the flap 310 exits the channel 308 and disengages from the sunshade shoe 304, which enables the first segment 314 to rapidly unfold behind the shoe 304 and/or return to an initial position. Further, in such examples, the second segment 318 of the flap 310 is fed and/or passes into the channel 308 and engages the sunshade shoe 304 as the shoe 304 moves in the first direction 326, where the shoe 304 urges the second segment 318 to fold in the channel 308. In other words, such movement of the sunshade shoe 304 along the rail causes the second segment 318 to enter the channel 308 and fold therein as the first segment 314 exits the channel 308 and unfolds to prevent the part of the rail from being exposed. The seal 302 and the sunshade shoe 304 may remain engaged in such a manner at all times during sunshade operation to create a smooth, seamless transition while never revealing the part of the rail.

Figure 4:
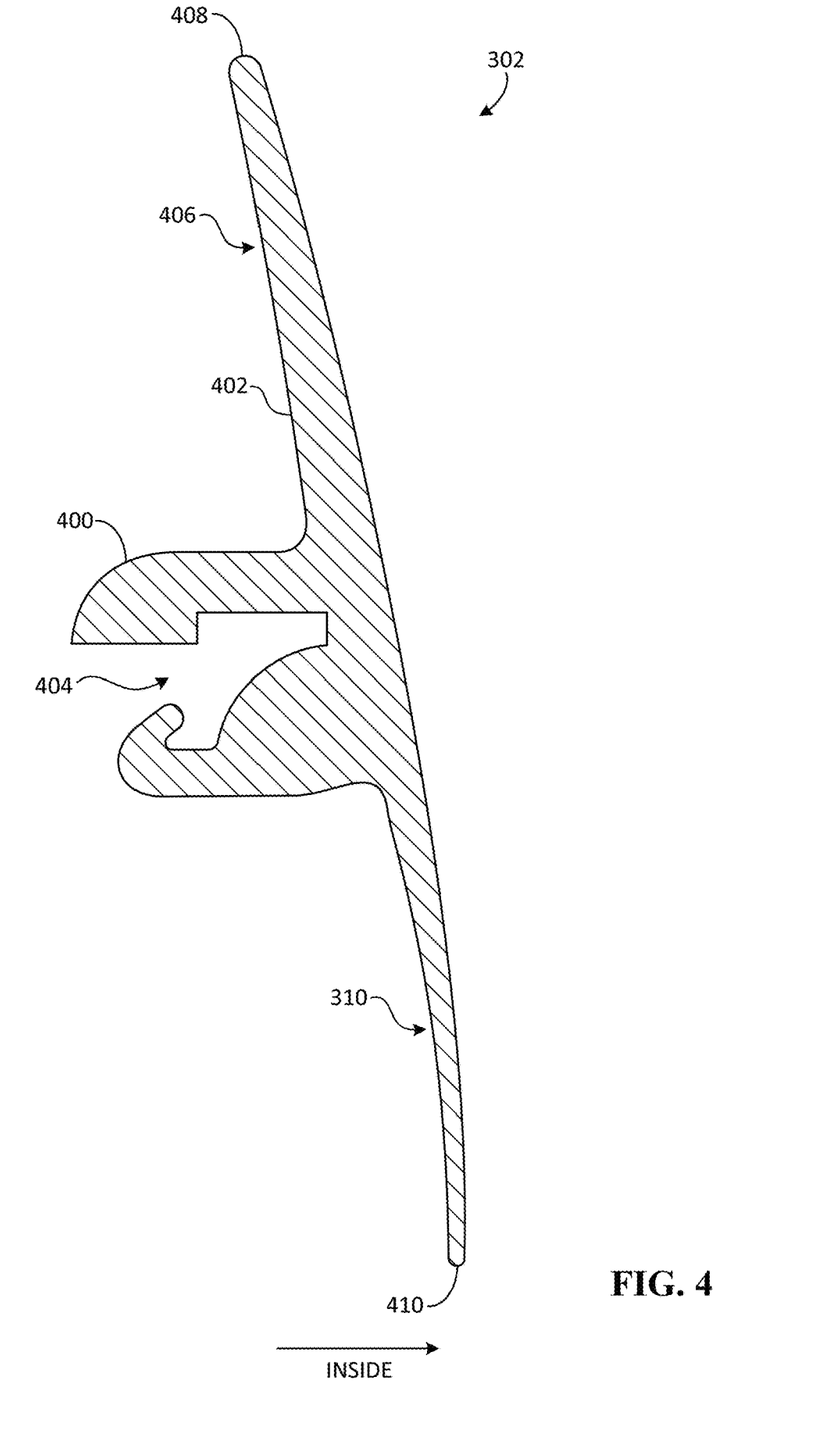
FIG. 4 is a cross-sectional view of the exemplary seal according to one embodiment.

FIG. 4 is a cross-sectional view of the seal 302 according to one embodiment. In FIG. 4, the seal 302 is provided with an attachment member 400 centrally positioned on an outer side 402 of the seal 302 that can couple to a sunroof rail The attachment member 400 may define a slot 404 in which a portion of the rail can be inserted, which facilitates attaching the seal 302 to the rail. Further, the attachment member 400 of FIG. 4 is connected substantially between the flap 310 and an upper portion 406 of the seal 302, where the flap 310 and the upper portion 406 extend away from the attachment member 400 in opposite directions. The flap 310 is sometimes referred to as a lower portion of the seal 302. The seal 302 of FIG. 4 is also provided with a first end (e.g., a distal end) 408 on the upper portion 406 that is configured to engage encapsulation material around a bracket that holds a panel 204, 206 of the sunroof 102, which facilitates reducing wind noise. A second end (e.g., a distal end) 410 of the seal 302 on the flap 310 is opposite to the first end 408.

Figure 5A:
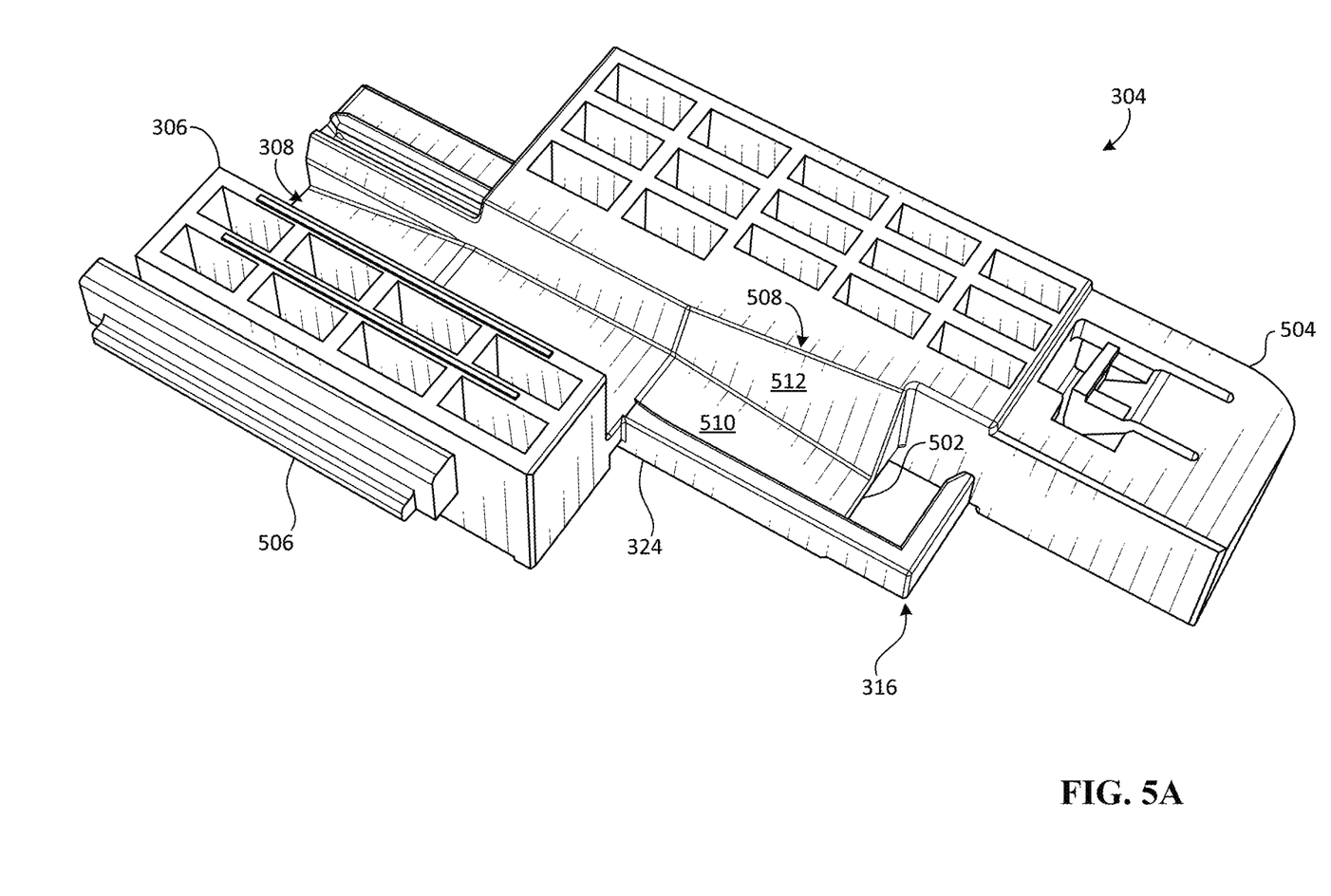
FIGS. 5A and 5B are detailed views of the exemplary sunshade shoe according to one embodiment.
Figure 5B:
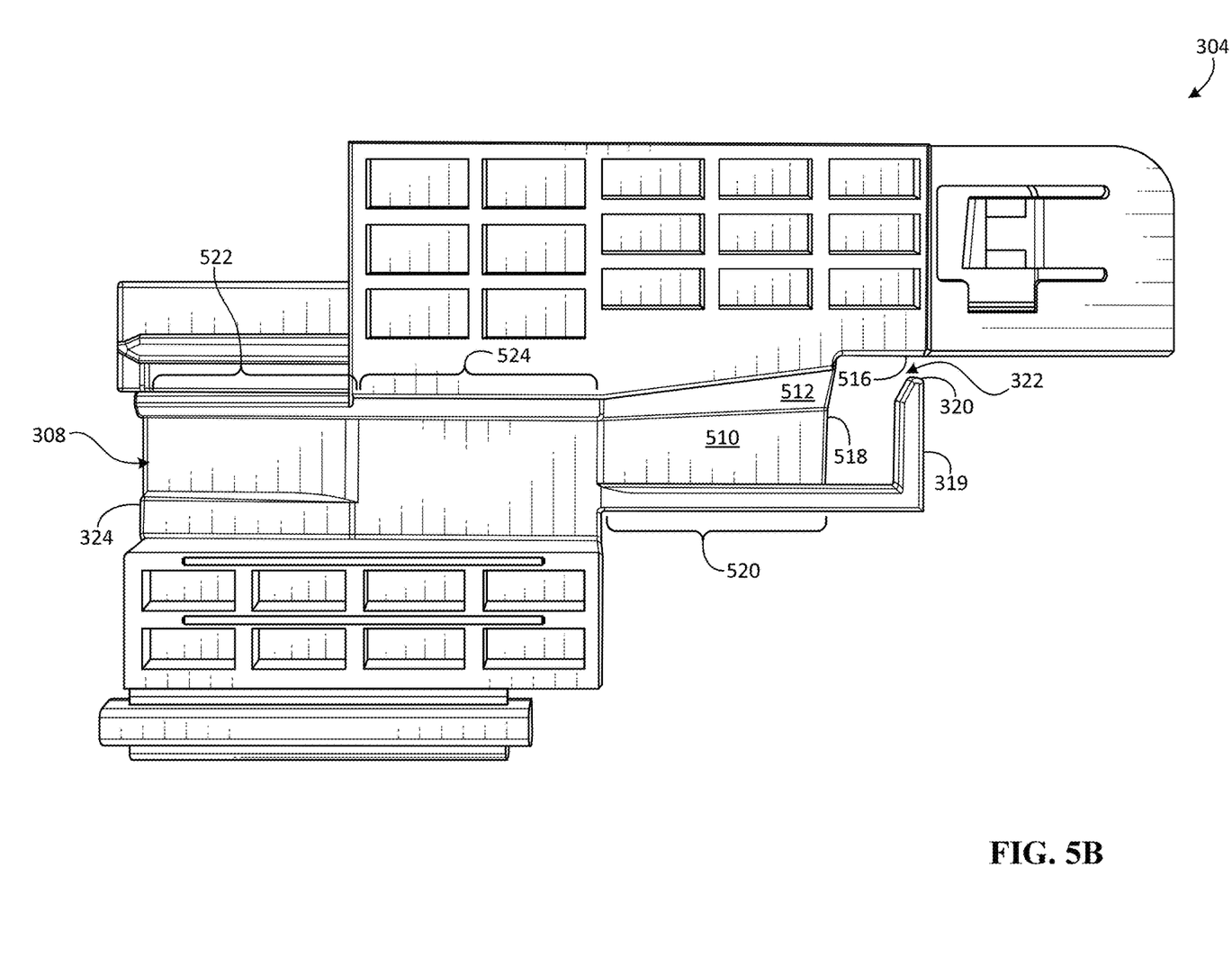

FIGS. 5A and 5B are detailed views of the sunshade shoe 304 according to one embodiment. Turning to FIG. 5A, a perspective view of the sunshade shoe 304 is shown in which the flipping structure 316 is coupled to the body 324 adjacent a first end 502 of the channel 308. In some examples, the sunshade shoe 304 includes a support member 504 coupled to the body 324, which is configured to receive and support a roll shade bar around which the sunshade is wrapped. The support member 504 can be, for example, a certain portion of the body 324 that includes an opening in which the roll shade bar can be inserted. In FIG. 5A, the guide member 306 and the support member 504 are positioned on opposite sides of the body 324. As such, in some examples, the body 324 is coupled to both the guide member 306 and the support member 504, where the channel 308 is on the body 324 between the guide member 306 and the support member 504. The guide member 306 can be provided with a protrusion 506 coupled thereto that can slide against the rail. The protrusion 506 of FIG. 5A extends in a length direction of the body 324 substantially parallel relative to the channel 308.

In some examples, to facilitate folding the flap 310 of the seal 302, the sunshade shoe 304 is provided with a ramp structure 508 at the first end 502 of the channel 308 that receives the flap 310. The ramp structure 508 can include a base surface 510 of the body 324 that is substantially inclined and a wall surface 512 of the body 324 adjacent and/or connected to the base surface 510. In FIG. 5A, the wall surface 512 is substantially angled relative to the base surface 510. The base surface 510 and the wall surface 512, together, form and/or define an area of the channel 308 at the first end 502 that may be tapered. In such examples, the base surface 510 and the wall surface 512 can be configured to apply certain forces to a segment of the flap 310 in the area of the channel 308 that cause the fold 312 to start forming on the segment as the surfaces 510, 512 slide against the flap 310.

Turning to FIG. 5B, a top view of the sunshade shoe 304 is shown in the illustrated example. In FIG. 5B, the end 320 of the hook 319 is spaced from a first side 516 of the body 324 by a relatively small distance. The end 320 of the hook 319 is also spaced from a second side 518 of the body 324 adjacent the first side 516. As previously described, the aperture 322 through which the flap 310 can be fed into the channel 308 is formed and/or defined by the hook 319 and the body 324.

In some examples, the channel 308 includes a first area 520 corresponding to the ramp structure 508, a second area 522 opposite to the first area 520, and an intermediate or third area 524 between the first and second areas 520, 522 that extends from the first area 520 to the second area 522. When the sunshade shoe 304 moves along the rail in the first direction 326 during the sunshade operation to close the sunshade, a segment of the flap 310 engaged with the hook 319 may pass through the aperture 322 and flip up into the first area 520 of the channel 308, where the base and wall surfaces 510, 512 slide against the segment to initiate folding. As the sunshade shoe 304 continues moving in the same direction, the segment of the flap 310 exits the first area 520 and enters the intermediate area 524 of the channel 308, where base and wall surfaces of the body 324 defining the intermediate area 524 slide against the segment of the flap to maintain the segment in a fully folded state. Further, as the sunshade shoe 304 continues moving in the same direction, the segment of the flap 310 exits the intermediate area 524 and enters the second area 522 of the channel 308, where base and wall surfaces of the body 324 defining the second area 522 slide against the segment of the flap 310 to initiate unfolding.

Figure 6A:
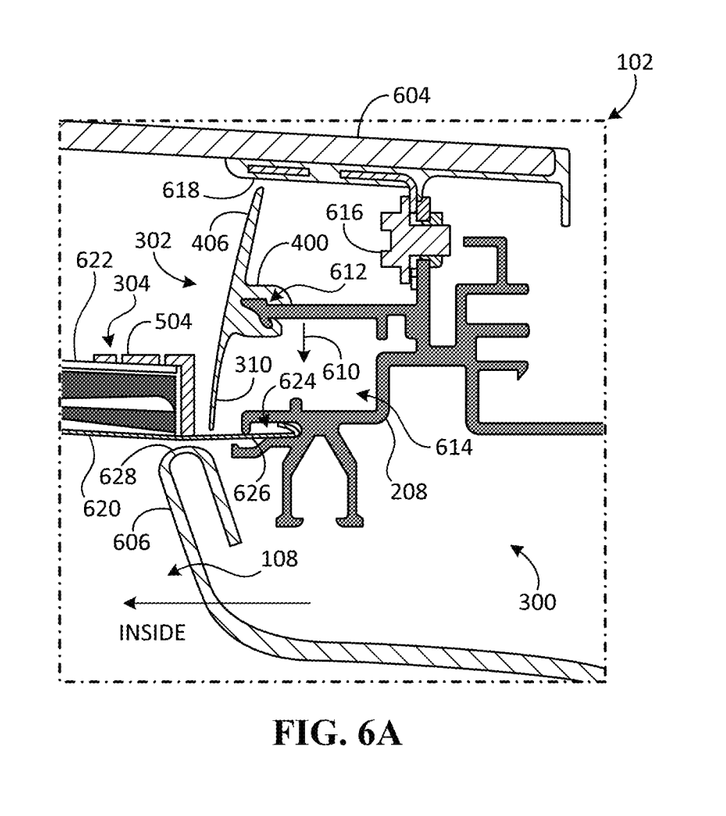
FIGS. 6A, 6B, 6C, 6D, 6E, and 6F are partial cross-sectional views of the sunroof of FIG. 2 at different locations thereof and show an exemplary assembly in the sunroof.

FIGS. 6A, 6B, 6C, 6D, 6E, and 6F are partial cross-sectional views of the sunroof 102 at different locations thereof and show the assembly 300 in the sunroof 102. Turning to FIG. 6A, the seal 302 is shown in the illustrated example, which is fixedly coupled to the first rail 208 via the attachment member 400. For example, a portion of the first rail 208 is inserted in the slot 404 defined by the attachment member 400, where inner surfaces of the attachment member 400 defining the slot 404 engage the portion of the first rail 208 to maintain a position of the seal 302 relative to the first rail 208. In particular, the seal 302 of FIG. 6A may be arranged along a length of the first rail 208 between a panel (e.g., glass) 604 of the sunroof 102 and an interior roof portion 606 of the vehicle 100. The interior roof portion 606 can be, for example, a headliner that partially defines the vehicle cabin 108. As shown in FIG. 6A, the flap 310 of the seal 302 extends in a certain direction (e.g., a downward direction) 610 away from an attachment point 612 of the seal 302 and the first rail 208 to hide a part of the first rail 208 from view in the vehicle cabin 108. The flap 310 of FIG. 6A substantially covers a primary guide channel 614 of the first rail 208 that may contain grease, which prevents an occupant in the cabin 108 from seeing and/or interacting with the first rail 208. On the other hand, the upper portion 406 of the seal 302 extends in an opposite direction (e.g., an upward direction) away from the attachment point 612 to hide a glass attachment 616 of the sunroof 102 adjacent the seal 302. In some examples, the upper portion 406 is configured to engage or directly contact a molding 618 on the panel 604 through which a glass holder bracket extends to reduce wind noise that may be heard in the cabin 108.

In FIG. 6A, the sunroof 102 is provided with a sunshade (e.g., a fabric sheet) 620 held by the sunshade shoe 304 via a bar (e.g., a roll shade bar) 622 that extends across and/or beneath the panel 604 from the first side of the sunroof 102 to the second side of the sunroof 102. The sunshade 620 of FIG. 6A may be wrapped around the bar 622. In some examples, a first end the sunshade 620 is coupled to the bar 622, while a second end of the sunshade 620 opposite to the first end is coupled to a different sunroof component in the roof 202. Additionally, the bar 622 may be connected between the sunshade shoe 304 and an additional sunshade shoe on an opposite side of the sunroof 102. The bar 622 extends away from the sunshade shoe 304 in a width direction of the vehicle substantially perpendicular to the first rail 208. As shown in FIG. 6A, the bar 622 is coupled to the support member 504 of the sunshade shoe 304. In particular, the sunshade 620 can be opened and/or closed by moving the sunshade shoe 304 along the first rail 208 (e.g., in tandem with the additional sunshade shoe). When in a closed position, the sunshade 620 covers the panel 604 or at least a portion thereof to reduce light intensity in the cabin 108. That is, the sunshade 620, when closed, may block at least some external light (e.g., sunlight) that would have otherwise entered the cabin 108.

The sunshade shoe 304 of FIG. 6A may be motor-driven. In some examples, the sunshade shoe 304 is connected to at least one of the motor(s) 106 via a link (e.g., one of a sunroof cable, a belt, and the like) extending from the sunshade shoe 304 to the motor(s) 106, where tension in the link created by the motor(s) 106 can be utilized to pull or move the sunshade shoe 304 along the first rail 208.

In some examples, to facilitate providing tension to the sunshade 620, the first rail 208 includes a secondary guide channel 624 extending along the length of the first rail 208 that receives a side portion 626 of the sunshade 620. In FIG. 6A, the side portion 626 of the sunshade 620 is positioned in the secondary guide channel 624 and can slide through the secondary guide channel 624 during sunshade operation. In such examples, the one or more surfaces of the first rail 208 defining the secondary guide channel 624 may impart certain load(s) on the side portion 626 to provide tension to the sunshade 620 and/or maintain tension therein. The sunshade 620 may be provided with an opposite side portion that similarly interacts with the second rail 210.

As shown in FIG. 6A, the flap 310 extends toward the interior roof portion 606 such that the end 410 of the flap 310 and an end 628 of the interior roof portion 606 are substantially in-line with each other, which creates an even appearance. In such examples, the end 410 of the flap 310 is spaced from the first rail 208 by a relatively small distance so that a relatively small gap exists between the end 410 of the flap 310 and the first rail 208. Similarly, the end 410 of the flap 310 may also be spaced from the end 628 of the interior roof portion 606 by a relatively small distance.

Figure 6B:
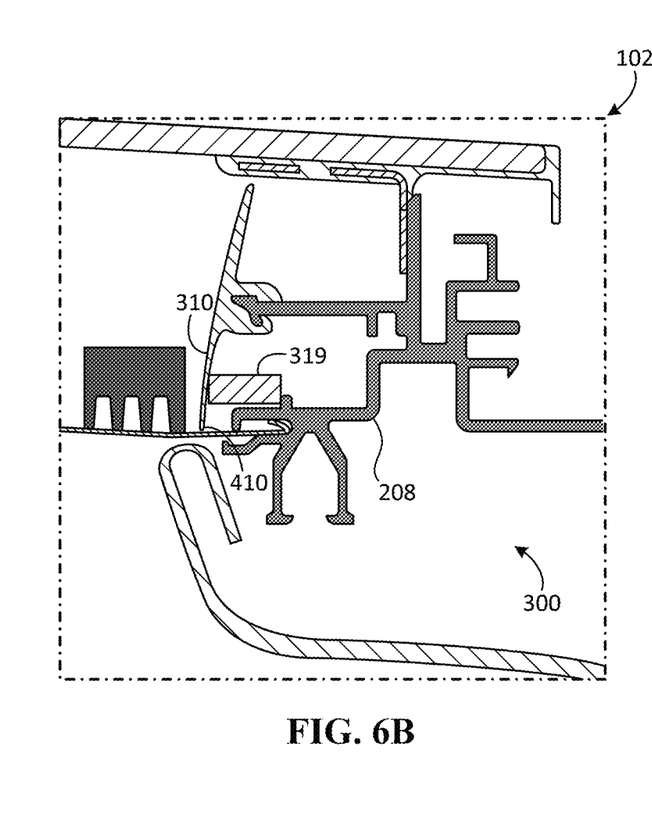

Turning to FIG. 6B, the hook 319 is shown in the illustrated example, which is engaged with a part of the second segment 318 of the flap 310. The hook 319 can push the part of the flap 310 away from the first rail 208 to increase a size of the gap between the end 410 of the flap 310 and the first rail 208. In contrast to the illustrated example of FIG. 6A, the end 410 of the flap 310 is spaced from the first rail 208 by a greater distance provided by the hook 319, which ensures the flap 310 does not contact the first rail 208 when sunshade shoe 304 flips and/or folds the flap 310.

Figure 6C:
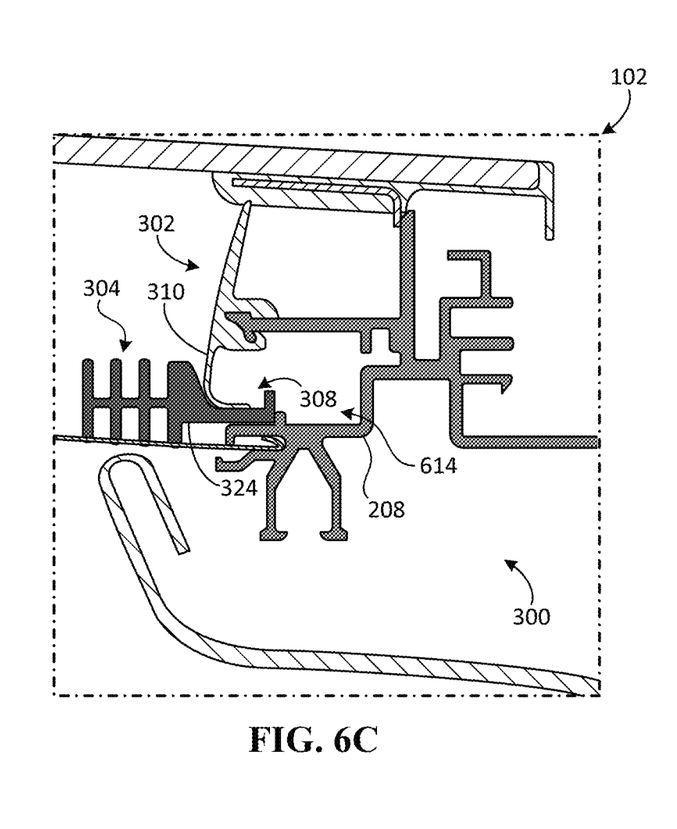
Figure 6D:
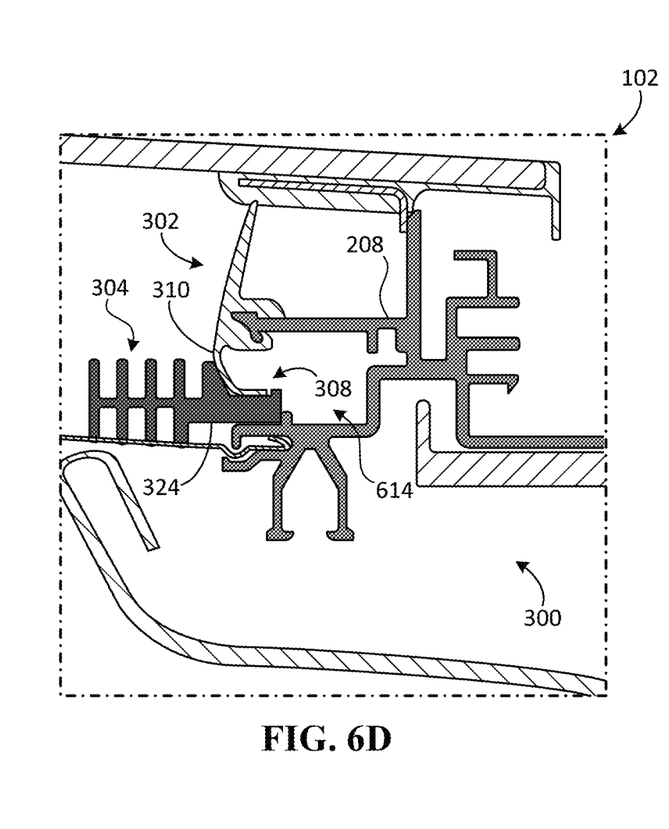
Figure 6E:
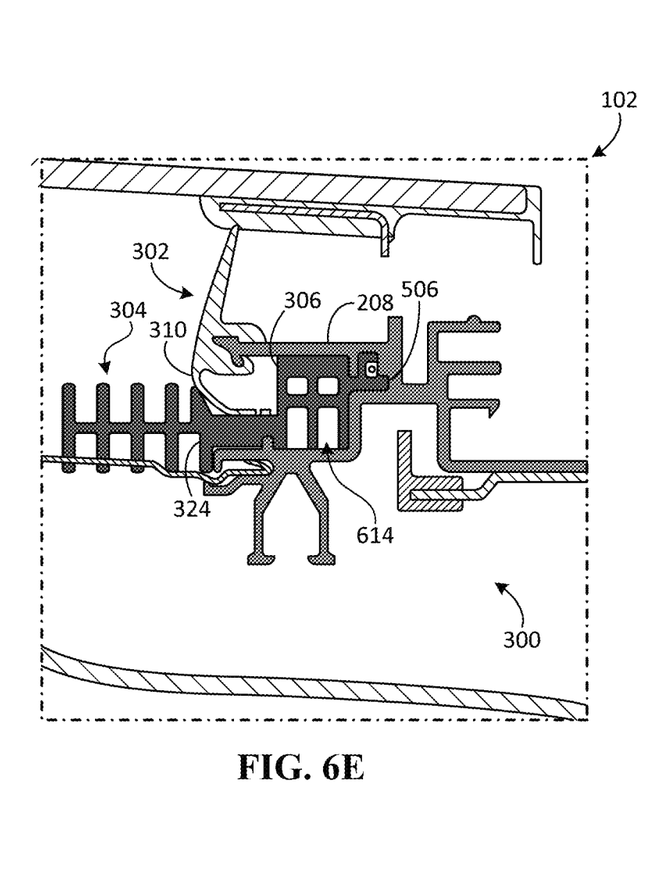

Turning to FIGS. 6C, 6D and, 6E, the first segment 314 the flap 310 is folded in the channel 308, where the primary guide channel 614 remains covered by the flap 310 and the sunshade shoe 304. In FIGS. 6C, 6D, and 6E, the body 324 of the sunshade shoe 304 is positioned beneath the flap 310 between the seal 302 and the first rail 208. In some examples, the flap 310 curves along outer surface(s) of the body 324 toward the primary guide channel 614. In such examples, engagement of the sunshade shoe 304 and the flap 310 may provide the flap 310 with a cross-sectional shape that varies along a length of the first segment 314. Further, as shown in FIG. 6E, the guide member 306 including the protrusion 506 can be positioned in the primary guide channel 614, thereby slidably coupling the sunshade shoe 304 to the first rail 208. As the sunshade shoe 304 moves along the first rail 208, one or more surfaces of the first rail 208 defining the primary guide channel 614 slide against the guide member 306 and/or the protrusion 506 to guide movement of the sunshade shoe 304.

Figure 6F:
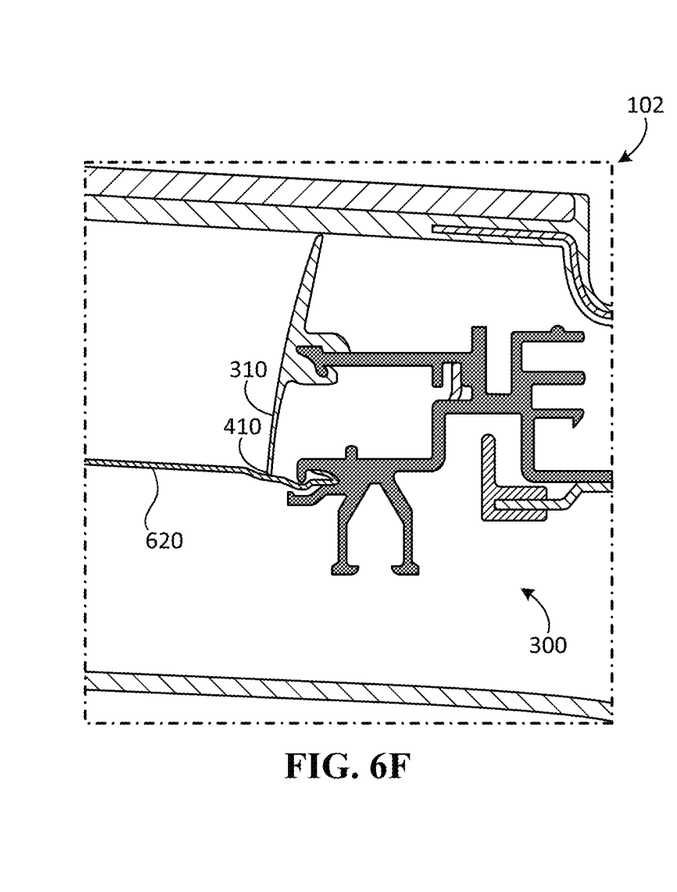

Turning to FIG. 6F, the flap 310 is substantially unfolded, such that the end 410 of the flap 310 is adjacent the sunshade 620. In some examples, when the sunshade 620 is closed, a relatively small gap may be maintained between the end 410 of the flap 310 and the sunshade 620. In other examples, the end 410 of the flap 310 may lightly contact the sunshade 620.

It will be appreciated that the systems, apparatus, and methods disclosed in the foregoing description provide numerous advantages. Examples disclosed herein provide seals and sunshade shoes for a sunroof that function cooperatively to hide a sunroof rail from view at all times inside a vehicle cabin, while also hiding glass attachment(s) and providing at least some noise reduction.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a sunroof of a vehicle, comprising:
a rail extending in a length direction of the vehicle, the rail including a guide channel to receive and guide at least one movable sunroof component;
an inner seal fixedly coupled to the rail that is arranged along a length of the rail between a panel of the sunroof and an interior roof portion of the vehicle, the inner seal including a flap extending in a downward direction away from an attachment point of the inner seal and the rail to hide a part of the rail adjacent the flap from view in a vehicle cabin; and
a shoe slidably coupled to the rail adjacent the flap that is movable along the rail to open or close a sunshade held by the shoe, the shoe including a channel extending through the shoe that receives the flap, the shoe engaged with a first segment of the flap folded in the channel while a second segment of the flap external to the channel is unfolded, movement of the shoe along the rail toward the second segment causing the second segment to pass into the channel and fold therein as the first segment exits the channel and unfolds to prevent the part of the rail from being exposed.

2. The assembly of claim 1, wherein the shoe includes a flipping structure attached thereto adjacent an end of the channel that urges the flap to move away from the rail.

3. The assembly of claim 2, wherein the flipping structure of the shoe is a hook including an end abutting the flap that is spaced from a body of the shoe, where the hook and the body, together, define an aperture through which the flap is fed into the channel when the shoe moves in a forward direction.

4. The assembly of claim 2, wherein the shoe includes a base surface that is inclined and a wall surface angled relative to the base surface that, together, define an area of the channel at the end of the channel, the base surface and the wall surface configured to apply forces to a segment of the flap in the area of the channel causing a fold to form on the segment that extends along the segment.

5. The assembly of claim 1, wherein the shoe includes
a guide member positioned in the guide channel that slides through the guide channel,
a support member coupled to a roll shade bar around which the sunshade is wrapped that extends in a width direction of the vehicle, and
a body coupled to the guide member and the support member, the channel being on the body between the guide member and the support member.

6. The assembly of claim 1, wherein the flap extends toward the interior roof portion such that an end of the flap spaced from the rail is in-line with an end of the interior roof portion.

7. The assembly of claim 1, wherein the inner seal includes an upper portion hiding a glass attachment of the sunroof adjacent the inner seal, the upper portion configured to engage a molding on a sunroof panel to reduce wind noise.

8. The assembly of claim 7, wherein the inner seal includes an attachment member connected between the upper portion and the flap that attaches the inner seal to the rail.

9. The assembly of claim 8, wherein the attachment member defines a slot in which a portion of the rail is inserted.

* * * * *